United States Patent [19]

Vetter

[11] 4,448,218

[45] May 15, 1984

[54] APPARATUS FOR SEALING LEAKS

[76] Inventor: Manfred Vetter, Postfach 1260, D-5352 Zülpich, Fed. Rep. of Germany

[21] Appl. No.: 270,828

[22] Filed: Jun. 5, 1981

[30] Foreign Application Priority Data

Nov. 28, 1980 [DE] Fed. Rep. of Germany ... 8031745[U]

[51] Int. Cl.³ .............................................. F16L 55/00
[52] U.S. Cl. ..................................... 138/99; 206/582; 285/15; 285/16; 285/97
[58] Field of Search ................... 206/582; 138/90, 97, 138/98, 99; 277/128; 128/672, 677; 52/514; 29/402.02, 402.09, 402.14, 402.12; 285/15, 16, 17, 96, 97, 100, 117, 293, 419

[56] References Cited

U.S. PATENT DOCUMENTS

| 1,089,122 | 3/1914 | Faught et al. | 128/677 |
| 2,560,237 | 7/1951 | Miller | 128/677 |
| 3,228,712 | 1/1966 | Hausmann et al. | 138/99 |
| 3,496,963 | 2/1970 | Bardgette et al. | 138/99 |

*Primary Examiner*—George E. Lowrance
*Assistant Examiner*—Jimmy G. Foster
*Attorney, Agent, or Firm*—K. S. Cornaby

[57] ABSTRACT

An apparatus for patching leaks in pipes, hoses, containers and the like has a rectangularly shaped inflatable pad comprising top and bottom layers with the top layer constructed of inelastic material and the bottom layer of very elastic material connected together. The pad has mutually opposite side strips and mutually opposing frontal and rear strips. Straps are provided for attachment to the side strips for securing the pad about a leak in a pipe, or the like. The pad is provided with a valve and member for inflating the pad.

10 Claims, 5 Drawing Figures

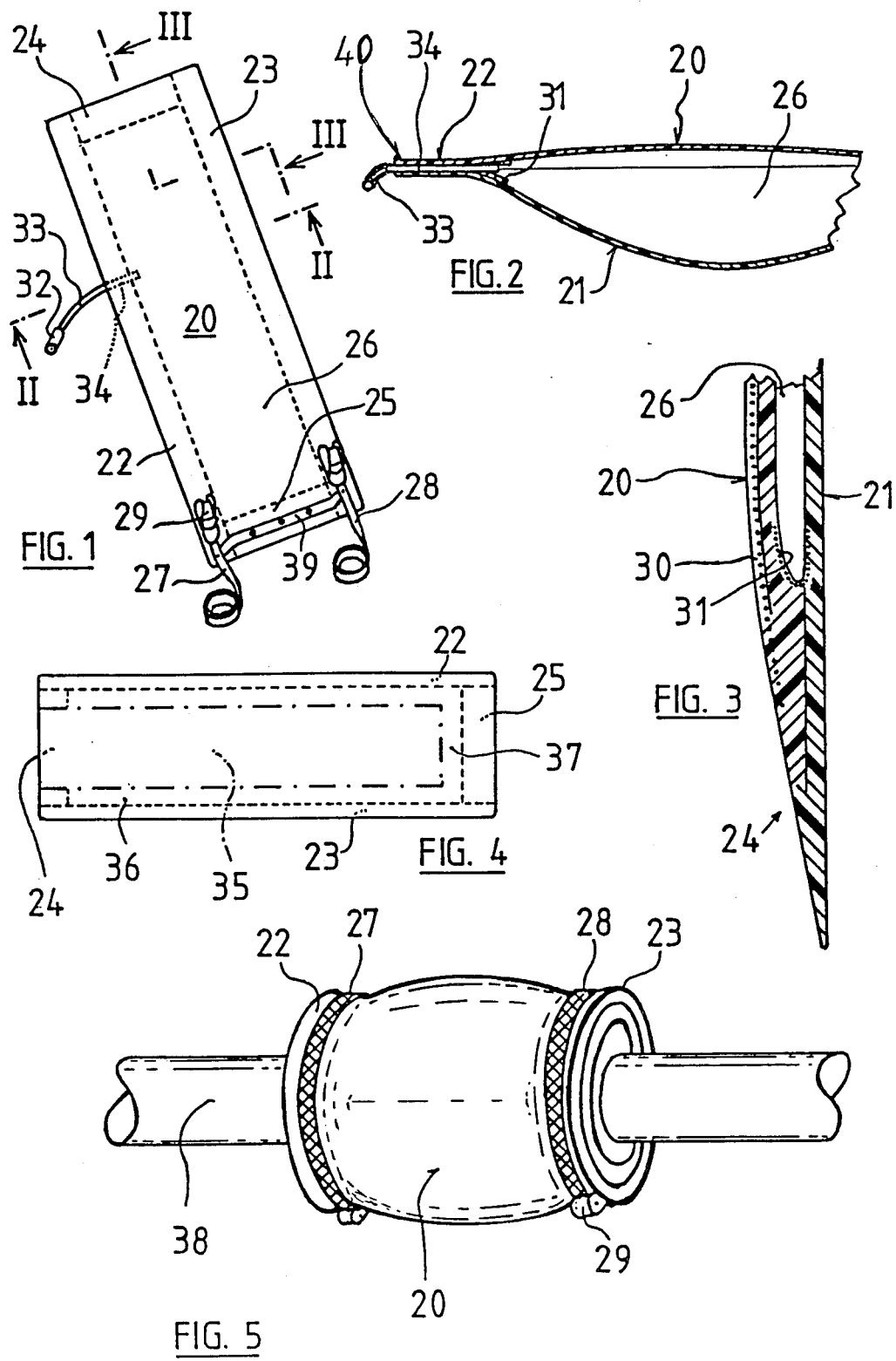

APPARATUS FOR SEALING LEAKS

BACKGROUND OF THE INVENTION

The invention relates to a patching arrangement for containers, pipes and similar objects, having an inflatable, flexible pad with an upper and a lower layer, and having two tensioning members, preferably in the form of straps.

Patching arrangements of this kind, which are also called patching pads, are usually rectangular in shape and have apertures for attachment along their narrowest sides, into which the tensioning members are snapped by means of spring-tensioned safety hooks.

In order to seal a leak on a container, this patching pad is placed over the place of leakage, the straps are wrapped around the container, connected to the eyes or spring safety hooks of the other narrow side and strapped tight. Thereafter, the final sealing is achieved by inflating the pad.

However, this kind of known patch is disadvantageous when the container has a small diameter, i.e., in cases where pipes of five to fifty centimeters are concerned. Furthermore, there are disadvantages if the pipe which has to be sealed has a leakage along a longer part of its circumference, i.e., if a welding joint has multiple leaks or if a pipe is torn or ripped open at an angle perpendicular to its axis.

The purpose of this invention is to avoid disadvantages of the above patch and to improve such patches so they can be attached quickly and conveniently on the leak. Furthermore, the patches should be as far as possible independent of the particular pipe diameter so that it can be applied conveniently in places of limited access.

The apparatus for patching leaks of the present invention solves this task in such a way that the lower layer is manufactured with a highly stretchable rubber elastic material and the upper layer is resistant to stretching. Also, the pad is made in a form for wrapping it around the object to be sealed. Furthermore, the pad is extended on each longitudinal side to match the width of the straps so that these extensions, also known as side straps, give a support surface for the straps.

Contrary to patches of the prior art which only partially cover the circumference of the leaking pipe and which utilize the straps to form a closed ring, the patch of the present invention is formed like a bandage and covers the leaking section of pipe in one wrapping in at least one full turn. The straps press the side strips of the patch tightly against the leaking pipe, which gives support for the sealing process along the area of the pad. Without the support of the straps placed around the side strips, the inflated pad would only touch the leaking pipe along a circumferential line, so that a planar sealing area is not achieved.

The total length of the present patching apparatus is chosen in such a way that it is approximately the same as the circumference of the largest pipe diameter it can be applied to. This patching arrangement can also be used for much smaller diameter of pipes, if it is wrapped in as many overlapping turns as necessary. Consequently, there is a very wide range of diameters of pipes which can be covered. As needed, it is therefore possible to select the needed correct patching without additional measurements.

In the range it is designed for, the invented patching apparatus covers the area from the largest to the smallest diameter of any leaking pipe without gaps in between.

In the deflated state, the patching apparatus is very thin so that it can be mounted on a pipe even in places of limited accessibility. The flexibility of the lower, and especially the upper, reinforced layer is chosen in a way that wrapping is simple even in tight turns. It is especially chosen in a way that the invented patching apparatus can also be applied in areas of pipe bends, in which a special advantage of the invention can be seen.

On the one hand, the width of the patching apparatus is so large that a sufficiently wide, typically encountered leak sealing collar is created; but on the other hand, the width is not too large to handicap implacement along pipe bends and pipe curves. A width of twenty centimeters has been proven very practical. In practical applications, it has been shown that all leaks on commonly used pipes can be sealed if patching apparatus of this width, but of different length, in particular with a length of ninety to one hundred-seventy centimeters, are available. As a consequence, this provides for the wide range of application of each single patching apparatus. Therefore, the practical useage is considerably simplified. When utilizing the pad, time-consuming selection considerations are not needed, since utilization always occurs under time pressure. Also stocking and space considerations in an emergency vehicle are less important problems.

It is especially advantageous, for practical applications of the invented patching apparatus, that the straps are either attached to the rear wrapping end of the pad or to each of the side strips. Then the whole patching arrangement consists of one piece so that the practical utilization is very much simplified, since important parts cannot be lost or do not have to be looked for.

Under the invention, straps are nearly completely obsolete, particularly if the side strips of the patch take over the task of the straps. Then, for example, a hook is attached on each side of the strips near the rear wrapping end of the pad. Independent of the pipe diameter, this hook can be connected to one of several eyes arranged along the upper side of the side strips. These eyes are separated a certain distance from each other. Instead of a hook-eye connection, a hook based on a friction principle can be chosen.

The valve of the pneumatic pad is best placed on one side of one of the side strips or around the center of the narrow side at the wrapping end. When the pad is wrapped up in the radial direction, it does not disturb or handicap the wrapping procedure and it is still easy accessible.

The lower layer of the pad is manufactured according to the invention from synthetic rubber which has high flexibility. To prevent the lower pad layer from dropping into the interior of a broken pipe, in particular in cases of large and sharp-edged holes, it is proposed to support the bottom layer of the pad with an external, reinforced layer. This reinforced layer can be arranged in such a way that there is an U-shaped area of no reinforcement, but high elasticity between the reinforced layer, both sides of the side strips, and the one cross strip in the rear at the wrapping end. With such a patching apparatus, it is also possible to seal pipes broken all way around; and two pipes can be temporarily butt-joined tightly, i.e., for testing purposes.

The narrow side where wrapping starts is preferably edged like a wedge, which eases the wrapping and avoids step build-up between the first and second wrapping layers. Furthermore, an acute-angled side provides the user with the best indication of where wrapping of the patching apparatus should start.

Preferably, the side strips have a projecting ridge on the outer edge, which limits sliding of the straps. As an alternative, the contact surface between the side strips and the straps can be corrugated or nonskid formed in such a way that a lateral movement of the straps is hindered.

The complete patching apparatus, i.e., the pad and the surrounding framelike side and cross strips, is manufactured by the proper connection of the upper and lower layer. To prevent a breaking or ripping of both layers, it is advantageous to plan for a reinforcement covering the area of connection between the layers in a similar manner known for pneumatic elevating pads.

Further features of the invention can be deduced from the claims and the following description.

THE DRAWING

In the following, preferred embodiments of the invention are explained by reference to the attached drawing. In this drawing are shown:

FIG. 1, A three dimensional view of a patching arrangement in accordance with the invention;

FIG. 2, A cross-section of view along the line 11—11 in FIG. 1;

FIG. 3, A cross-section of view along the line 111—111 in FIG. 1;

FIG. 4, A view of the lower layer of the patching apparatus in FIG. 1; and

FIG. 5, A three-dimentional view of a patching apparatus wrapped around a leaking pipe.

DETAILED DESCRIPTION OF THE ILLUSTRATED EMBODIMENTS

The patching apparatus shown in FIGS. 1–5 is rectangular and relatively long. Its main components are a reinforced very inelastic, but flexible top layer 20 and a connected bottom layer 21 of a very elastic material, in particular made from synthetic rubber. These layers 20, 21 are connected, that is, vulcanized, glued, sewed, etc., in such a way that along the sides two side strips 22, 23 of about 3.5 cent. in width are formed. Furthermore, a cross strip 24 is provided, which is at the frontal end where wrapping starts. Similarly, a cross strip 25 is provided at the rear wrapping end. These strips 22 to 25 frame an inflatable pad 26 which (see FIG. 2) is arched downwards when inflated.

On the rear side which forms the cross strip at the wrapping end 25, a pair of straps 27, 28 are placed. They end in a ratchet-type lock 29, which is close to the rear cross strip 25. The other, considerably longer, end is illustrated in a wrapped state in FIG. 1, and is longer than the length of the side strips 22, 23. The width of the straps is about 3 centimeters; that means they are not wider than the side strips 22, 23, onto which they are placed during practical application as FIG. 5 indicates.

The frontal strip 24 is wedgelike, sharpened over the whole width as in particular FIG. 3 illustrates. The sloping is done in such a way that the bottom layer of the arrangement stays flat, which, in turn, minimizes any step-like increments in the case of more than one full wrap.

The upper layer 20 is made rigid by an inserted reinforcement 30, for example, a woven nylon material. Since this reinforcement 30 is extended even into the side strips 22, 23 and the cross-strips 24, 25, even the strips are practically non-elastic. Furthermore, additional reinforcement strips 31 are inserted into the acute-angled connection areas between the top 20 and bottom layers 21 to prevent ripping of these connecting areas. These reinforced strips are connected to the layers 20, 21, by glueing, vulcanizing or similar methods. FIG. 2 shows a glued connection through which, according to FIG. 3, a reinforced strip 31 is inserted during vulcanization. Side strips 22, 23 have a projecting ridge 40 on the outer edge, which limits sliding of straps 27, 28.

Furthermore, from FIGS. 1 and 2, a possible placement of the valve 32 can be seen. The valve 32 is placed approximately in the center of the side strip 22. Air can be forced from the valve 32 through a flexible pressure hose 33 of short length, which is connected to a small tube 34. This small tube 34 follows, as FIG. 2 indicates, through side strip 22. This small tube 34 prevents a blocking of the air supply when the straps 27, 28 are tightened.

In the embodiment shown in FIG. 4, the lower layer 21 of the pad 26 is supported additionally by an outside layer of reinforcement 35. This reinforcement 35, however, does not cover the whole area of the pad as FIG. 4 shows, but there are areas free of reinforcement between the reinforced layer 35 and the two side strips 22, 23 on both sides. The same applies for the rear cross strip 25 and the reinforced layer 35 where there is a strip without reinforcement 37. Due to this layout, a U-shaped zone of no reinforcement is formed which guarantees a sealing effect.

In FIG. 5, the invented arrangement is shown in a practical application, in which a leak on a relative small pipe 38 is sealed. For this purpose, the arrangement is wrapped in several layers around this pipe 38. The wrapping is secured with the straps 27, 28 with the help of the locks 29. Then follows an inflating of the area of the pad, which is situated between the side strips 22, 23 and, consequently, between the straps 27, 28, by forcing air through the valve 32, the pressure hose 33, and the small tube 34. This procedure results in a barrel like arching as can be seen in FIG. 5. Since the outer, upper layer 20 is not very elastic but the lower layer 21 has the capability of stretching, the lower layer 21, is pressed flat against the outer surface of the pipe along the pad area 26 and seals existing leaks, even for longer time periods.

Since the lower layer 21 is very elastic, the patching arrangement should never be inflated alone, because otherwise the lower layer 21 could be stretched excessively. It is advantageous to have an inner shell inside the area of the pad to prevent excessive stretching.

The attachment of the straps 27, 28 on the rear cross strip 25 is shown in FIG. 1. From this can be seen that a short corresponding cross strap 39 is connected in the rear cross strip 25 through three riveted joints in such a way that the connections are laterally moveable, on which the straps 27, 28 are attached to the locks 29. As FIG. 1 indicates, the straps 27, 28 are connected to the surface of the top layer 20 so that they are always on the outside during wrapping, while the lower layer 21 is in contact with the pipe 38.

I claim:

1. Patching apparatus for containers, pipes and similar objects, comprising in combination:
    an inflatable pad with a non-elastic top layer and an attached flexible lower layer, with said lower layer having an attached external reinforced layer arranged in such a way that an U-shaped area of high elasticity is formed between said flexible lower layer and said external layer;

two tension straps;

four strips framing said pad, two of which are side strips disposed respectively along each of two longer sides of said pad and being adapted to the width of said straps for receiving said straps, one frontal cross strip at the frontal end of said pad, and one rear cross strip at the rear end of said pad; and a small tube being connected through one of the strips selected from the group consisting of said side strips and said rear cross strip, said tube having valve means for connection to a pressure source.

2. Patching apparatus according to claim 1, in which the outside edge of said side strips is strengthened.

3. Patching apparatus according to claim 1, in which the inside of said pad contains a shell.

4. Patching apparatus according to claim 1, in which said bottom layer of said pad is manufactured from a highly elastic, synthetic rubber.

5. Patching apparatus according to claim 1, in which the straps are attached close to said rear cross strip.

6. Patching apparatus according to claim 1, in which one end of each strap has locking means.

7. Patching apparatus according to claim 1, in which said locking means is placed above said side strips and close to said rear cross strip.

8. Patching apparatus according to claim 1, in which said pad, said side strips, said frontal cross strip and said rear cross strip are formed by connection of said top and bottom layer.

9. Patching apparatus for containers, pipes and similar objects, comprising in combination:

an inflatable pad with a non-elastic top layer and an attached flexible lower layer;

two tension straps;

four strips framing said pad, two of which are side strips disposed respectively along each of two longer sides of said pad and being adapted to the width of said tension straps for receiving said straps, one frontal cross strip at the frontal end of said pad, and one rear cross strip at the rear end of said pad, said rear cross strip having a cross strap attached thereto with the respective end of said cross strap being connected to each of said side straps; and a small tube being connected through one of the strips selected from the group consisting of said side strips and said rear cross strip, said tube having valve means for connection to a pressure source.

10. Patching apparatus for containers, pipes and similar objects, comprising in combination:

an inflatable pad with a non-elastic top layer and an attached flexible lower layer;

two tension straps;

four strips framing said pad, two of which are side strips disposed respectively along each of two longer sides of said pad and being adapted to the width of said tension straps for receiving said straps, said side strips having a projecting ridge on the outer edge thereof for limiting the sliding of said strips, one frontal cross strip at the frontal end of said pad, and one rear cross strip at the rear end of said pad; and a small tube being connected through one of said strips selected from the group consisting of said side strips and said rear cross strip, said tube having valve means for connection to a pressure source.

* * * * *